United States Patent [19]

Widmer

[11] 4,135,908
[45] Jan. 23, 1979

[54] METHOD OF AND APPARATUS FOR AEROBIC DECOMPOSITION OF ORGANIC SOLIDS

[76] Inventor: Peter Widmer, Mooswiesstrasse 3, Pfaffhausen, Switzerland, 8122

[21] Appl. No.: 817,483

[22] Filed: Jul. 20, 1977

[30] Foreign Application Priority Data

Mar. 8, 1977 [CH] Switzerland ............... 2844/77
Apr. 4, 1977 [CH] Switzerland ............... 4171/77

[51] Int. Cl.² .................................. C05F 11/08
[52] U.S. Cl. ................................. 71/9; 195/127
[58] Field of Search ............. 23/259.1; 71/8, 9, 11; 34/174; 55/259

[56] References Cited

U.S. PATENT DOCUMENTS

| 107,680 | 9/1870 | Hanna | 34/174 |
| 1,558,119 | 9/1925 | Sherban | 34/174 |
| 2,490,097 | 12/1949 | Seaman et al. | 23/259.1 |
| 2,660,809 | 12/1953 | Morrison | 23/259.1 |
| 2,716,509 | 8/1955 | Saul | 55/259 |
| 2,878,112 | 3/1959 | Morrison | 23/259.1 |
| 3,138,448 | 6/1964 | Schulze | 23/259.1 |
| 3,522,692 | 8/1970 | Brookman et al. | 55/233 |

FOREIGN PATENT DOCUMENTS 2316476  10/1974  Fed. Rep. of Germany ............ 71/9

Primary Examiner—S. Leon Bashore
Assistant Examiner—Chris Konkol
Attorney, Agent, or Firm—Browdy and Neimark

[57] ABSTRACT

A method of aerobic decomposition of organic solids involves mixing material containing the organic solids to be decomposed with relatively drier material in order to set an upper limit to the dampness of the mixture to be processed. An apparatus for aerobic decomposition includes a decomposition reactor in the form of a tower which tapers in the upward direction. The bottom of the reactor is square or rectangular in cross section and its top is oval or circular in cross section. The bottom of the reactor is made in the form of a roller grid. A mixing section is provided for mixing the material to be decomposed with relatively drier material.

26 Claims, 8 Drawing Figures

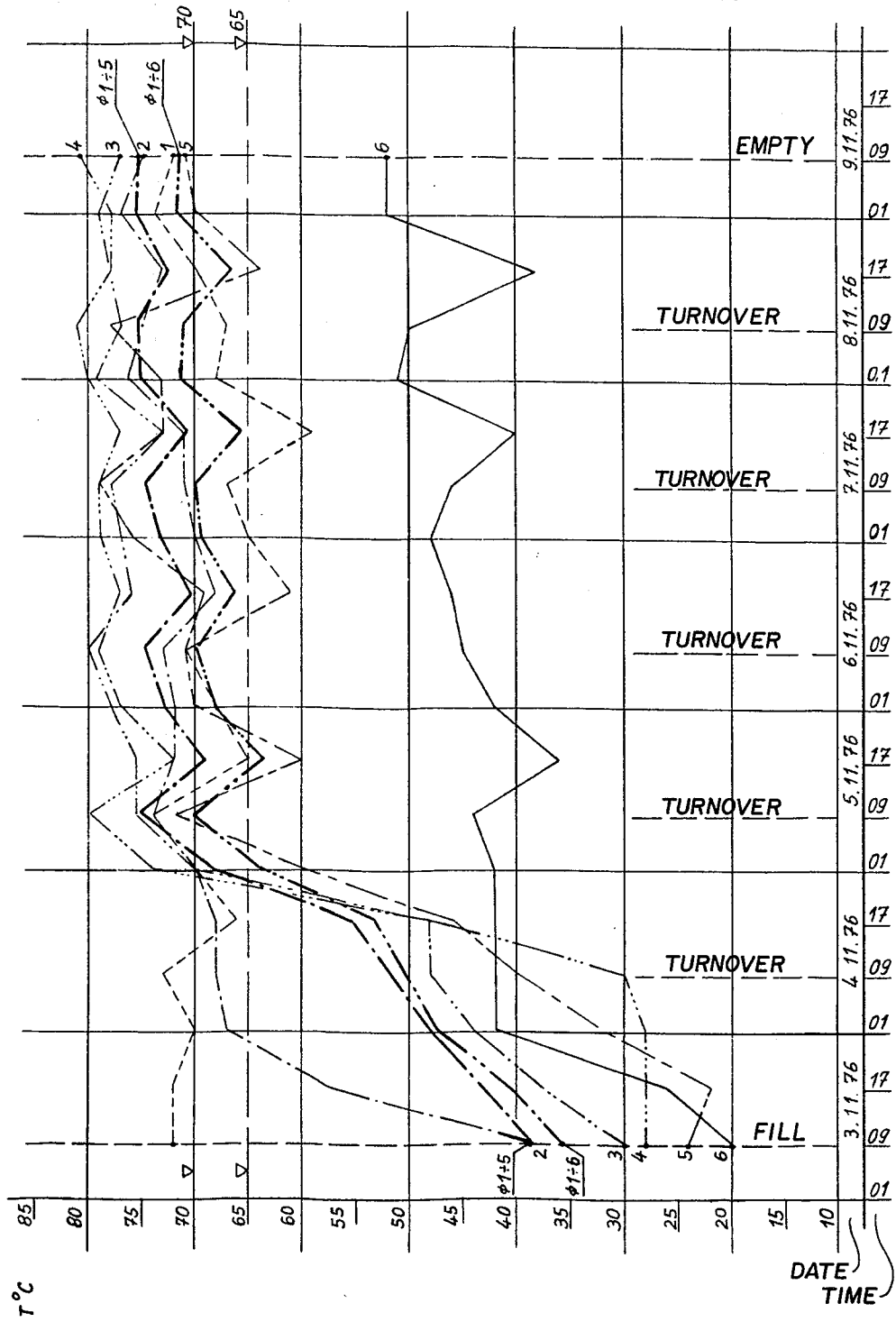

METHOD OF AND APPARATUS FOR AEROBIC DECOMPOSITION OF ORGANIC SOLIDS

BACKGROUND OF THE INVENTION

The present invention relates to a method of aerobic decomposition of organic solids, as well as to an apparatus for carrying out the method.

Methods are known for converting sludge from community and industrial sewage treatment plants, as well as animal excrement from places where animals are kept in large numbers, into an environmentally harmless solid by means of biological, thermal, and mechanical processing.

Such methods are based upon the known aerobic decomposition techniques (composting). The technique which has been known for a long time from the literature in the field and which is probably the one used most often requires, for example in the composting process, employing piled heaps of debris in a more or less pyramidal shape. A processing time of several months is required and little or no destruction of pathogenic organisms usually occurs.

In these known methods, an effort is made to remove considerable moisture from the decomposing material during the aerobic decomposition process.

Aerobic decomposition methods require sufficient amounts of oxygen for activation of the aerobic microorganisms.

The heaps piled up at ground level seldom reach temperatures over 50° C., even at their centers. Although higher temperatures can be produced for short periods of time by turning over the heap with shovels or mechanically, thus allowing oxygen to enter the material, the decomposition process very rapidly dies down once more, because the heap is unable to take up oxygen automatically. This is primarily because the outer layers of the heap very rapidly lose their moisture as a result of weathering, dry out, and form a crust which prevents oxygen uptake (breathing of the heap).

This heap technique, which is largely dependent upon weathering and manual work (turning over), can, however, be influenced in a definitely positive fashion if the heap of debris is arranged about 30 centimeters above the ground on an air-permeable grid and protected against the weather. As the decomposition process begins, the middle of the heap warms up and the rising warm air passes through the porous bottom and allows fresh air to enter the heap. Improved decomposition efficiency is definitely achieved with this type of heap composting.

However, limits are imposed on this self-heating process, since the heat losses from the large surface of the heap are greater in this case than the heat which is liberated, so that it is impossible to reach an optimum steady temperature. This and similar findings regarding the course of the decomposition process have led to the construction of decomposition reactors.

Naturally, the reactor is limited as far as the size of the area which can accept heaps is concerned. This limitation on area, especially on the diameter of decomposition reactors, as they are known today (Schnorr-Kneer-Kahlin), results from the mechanisms which are used to empty the reactors and the mechanical limits to the stress that can be imposed upon them. The filling volume of such reactors is therefore increased by increasing the filling height. As the filling height increases and the pressure produced thereby increases as well, the number of gas-conducting pores decreases in one direction, even with very coarse pulverization of the filling material intended for decomposition, and this prevents natural air circulation and resultant input of oxygen, a condition which automatically leads to undesirable anaerobiosis of the decomposing material. The incorporation of mixers to introduce air has proven to be extremely troublesome from the mechanical standpoint and of questionable value from the chemical engineering standpoint. Likewise, forced ventilation systems using pipes incorporated into the reactor or air jets in the bottom of the reactor, even when pure oxygen is used, appear not to produce any results that justify the expense.

The systems for decomposition of sludge or animal excrement by reactors or composting drums, with addition of presorted garbage, straw, hay, sawdust or bark as so-called carbon carriers, likewise sufficiently well-known from the literature in the field, in most cases failed to live up to the expectations made for them. This is especially true for the compost produced by these installations which, as far as structure and freedom from pathogenic organisms and the like is concerned, often does not allow this product to be used safely as fertilizer on areas for agriculture.

One of the principal reasons why the well-known Kneer reactor decomposition process fails is, in addition to the delivery system, the shape of the reactor. The latter is a tall, circular cylinder, which is emptied by means of a cutting tool which runs around the bottom of the reactor, and which need not be discussed in detail here.

However, the round shape of the decomposition reactor poses a genuine problem. This is a shape which is ideal for pourable materials, but very often leads to so-called bridging when the height of the stored material increases and the stored material is damp. This bridging takes place in such a container primarily when it is to be emptied.

Since the circulating, cutting, and emptying mechanism cuts away the material and moves it to one side immediately above the bottom of the reactor and feeds it into a dump chute, the decomposed material shifts toward one side and exhibits an increased tendency to clog inside the container as a result of this settling. The resulting bridges made of decomposed material which are produced by this technique can only be broken up by vibration applied from outside or by poking the bridges with a rod from above.

SUMMARY OF THE INVENTION

It is the principal object of the present invention to provide a method of and an apparatus for aerobic decomposition of organic solids which overcome in large measure the disadvantages and shortcomings mentioned above.

Another object of the present invention is to achieve a greater degree of purity of the resultant product and its safe application in agriculture.

From this goal, it follows that admixture of garbage, etc., which serves to reduce the water content in the wet product and simultaneously serves as a so-called carbon carrier, cannot be used by definition in the reactor.

Hence, the aim of the present invention is to provide a method which serves to produce an agriculturally useful solid material from animal excrement or sludge from industrial and community sewage treatment plants with particular attention to ecological and economic aspects. The most important goals which are to be achieved include:

1. Permanent elimination of unpleasant odors;
2. Inactivation of pathogenic, especially parasitic organisms;
3. Considerable retention of ingredients (N, $NH_3$, P) which are usable as plant fertilizers;
4. Drying of the decomposed material to a solid content of 20% without requiring aftercuring and final drying in heaps;
5. Keeping the material to be processed clean during the process without admixture of additives such as sawdust, bark, straw or peat as so-called carbon carriers; and
6. The production of a cost-favorable, storable and manageable product with a maximum water content of about 20%.

In this sense, the method according to the present invention is characterized by the fact that the material to be decomposed is mixed with drier material in order to confer on the mixture to be treated an upper limit of moisture.

BRIEF DESCRIPTION OF THE DRAWINGS

FIG. 8 is a graphic representation of the typical temperature development for the method of the present invention during an aerobic decomposition process lasting six days.

DETAILED DESCRIPTION OF THE PREFERRED EMBODIMENTS

Figure 1:
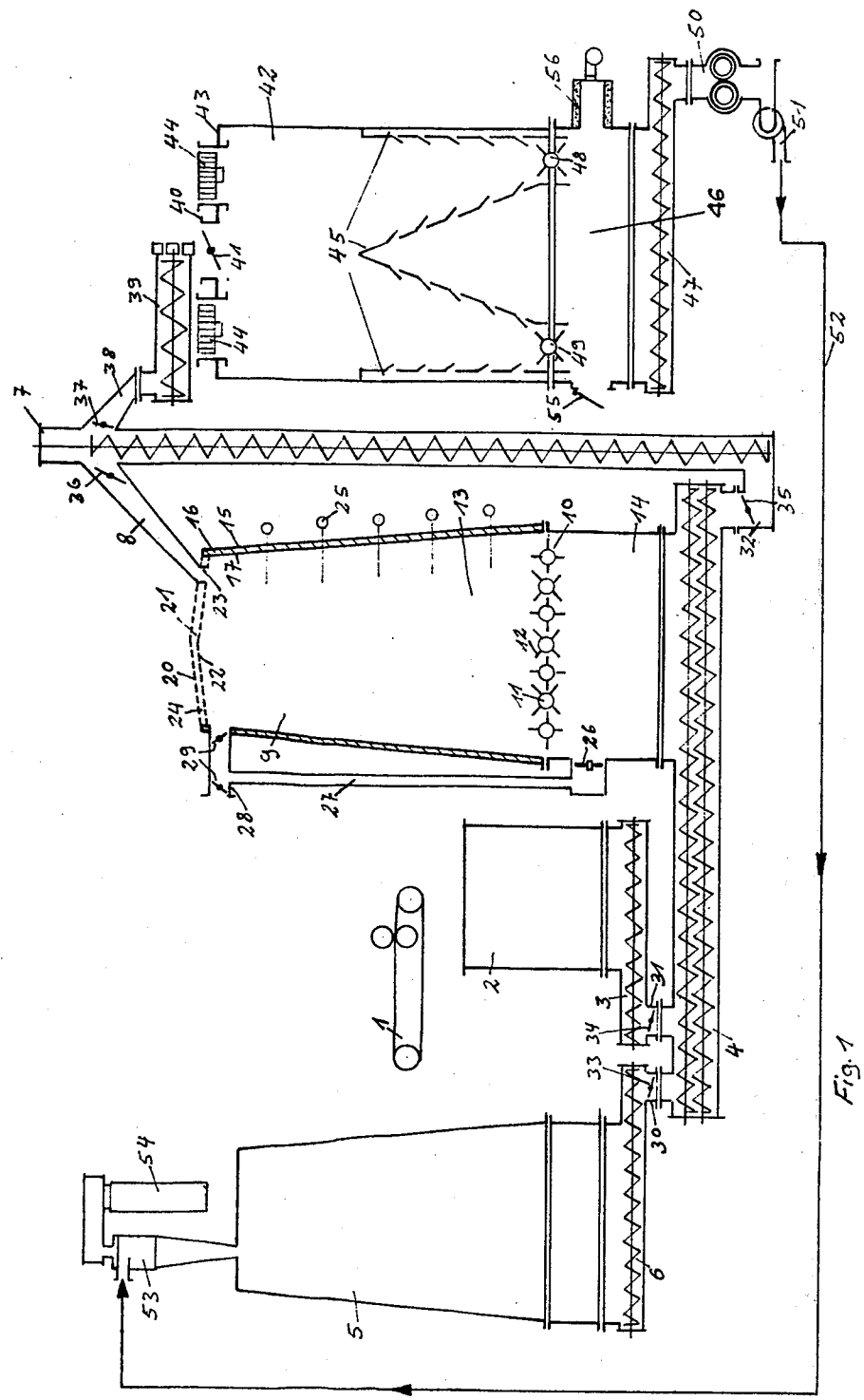
FIG. 1 is a schematic diagram of an aerobic decomposition apparatus according to an exemplary embodiment of the present invention.

An apparatus which allows working the method according to the present invention is shown aschematically in FIG. 1. In this apparatus, the material to be decomposed is dewatered as much as possible by a conventional, preliminary dewatering machine shown generally at 1, e.g. pressing rollers, centrifuges or the like. The solid material, which still contains considerable moisture, then passes from the dewatering machine 1 into a storage container 2, where it is stored.

From the storage container 2 the wet material is fed by a continuously adjustable feed screw 3 into a double-shaft mixer 4.

At the same time, appropriate ground dry material is simultaneously fed to the double-shaft mixer 4 from a dry material supply silo 5, likewise by a continuously adjustable feed screw 6; the two products are intensively mixed with one another in the double-shaft mixer 4. During the mixing process, the double-shaft mixer 4 conveys the resultant damp pulverized product to a vertical feed screw 7. The prepared damp mixed material, transported upward by the vertical feed screw 7 and intended for the decomposition process, is fed into a decomposition reactor 9 via a dump chute 8.

The decomposition reactor 9, preferably seamless and made of fiberglass-reinforced polyester, changes gradually from a square cross-sectional shape at its bottom to a circular cross-sectional shape at its top, with a slope of approximately 8° upward. The bottom of the reactor 9 may be of rectangular cross section and its top may be of oval cross section.

Thus, the reactor 9 is similar to a cooling tower and, when empty and open at the top, also produces the typical suction effect because of this design. The suction or selfventilating effect cannot be completely eliminated even when the reactor 9 is filled with porous loose material. However, it is not sufficient to supply the decomposing material automatically with oxygen.

As a rule, cooling towers have a circular cross section at the base However, it is impossible or at best very difficult to incorporate a toothed roller grid 10 in such cooling towers, as is done in the present apparatus. It was consequently readily apparent to do away with the ideal circular design and to select a square cross section at the base which would likewise not inhibit the flow of material.

As a result of the shape of the reactor tapering conically upward, all of the material or decomposing material 13 rests upon the roller grid 10 which covers the entire base. Therefore, there is no tendency for bridges to be formed in reactor 9.

Likewise, such bridging cannot occur even during turning over or emptying steps, because the material 13 is always settling downwardly into a portion of the reactor 9 of larger cross section.

One of the principal aims, namely an unimpeded emptying of the reactor 9, is reliably achieved by this design.

The toothed roller grid 10 forms the bottom of the decomposition reactor 9 and includes rollers 11 arranged side by side and parallel to one another and is provided with radially extending teeth 12. The teeth 12 prevent the material which is to be decomposed from slipping through and ensure that it remains lying on the roller grid 10.

The toothed roller grid 10 simultaneously serves as a feed device to empty the decomposition reactor 9. For this purpose, the individual rollers 11 together with their teeth 12 are simultaneously set rotating slowly, teeth 12 seizing the material 13 resting upon them and throw it into a material-collecting funnel 14 located beneath the roller grid 10.

Figure 2:
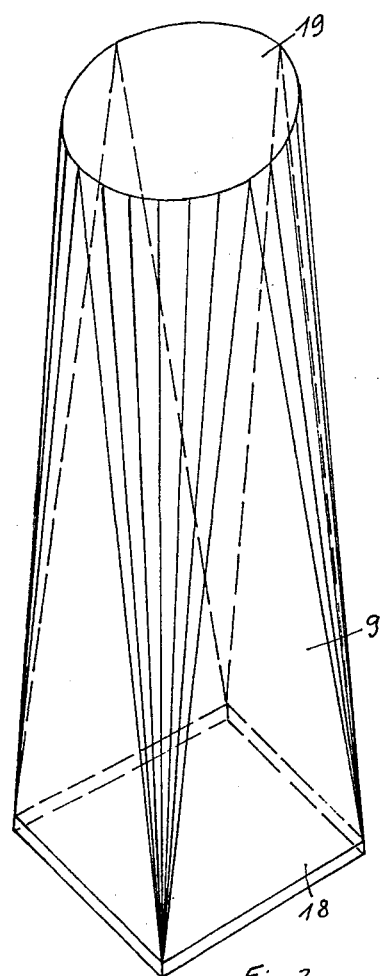
FIG. 2 is an isometric view of the design of a decomposition reactor which forms part of the apparatus of FIG. 1.
Figure 3:
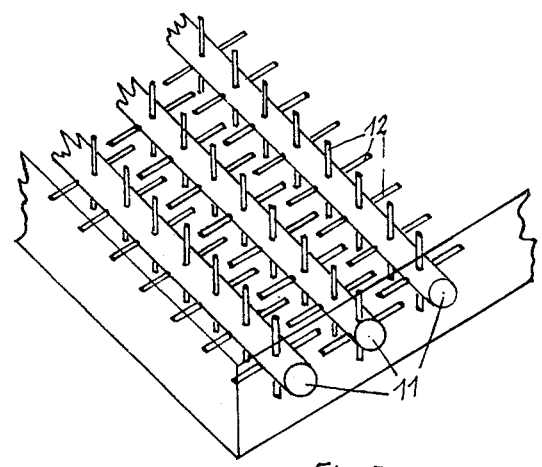
FIG. 3 is a partial section, shown in an isometric view, of the toothed roller grid which serves as the bottom of the reactor of FIG. 2.
Figure 5:
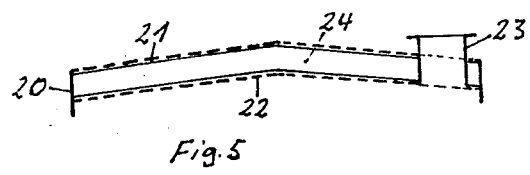
FIG. 5 is a diagram in cross section of the reactor cover which forms part of the apparatus of FIG. 1 and serves as an odor absorber.

The double-shaft mixer 4 is flanged to the lower end of the material-collecting funnel 14 and simultaneously serves as a feed assembly in the emptying of the decomposition reactor 9. The decomposition reactor 9 proper includes a doublewalled container having a heat-insulating layer 17 located between two walls 15 and 16. As indicated, the shape of the decomposition reactor 9 changes from a square at the base 18 (FIG. 2) into a circular cross section 19 as it tapers conically upward. The decomposition reactor 9 is sealed by a cover 20, which simultaneously is designed to serve as an odor absorber. The cover 20 is provided with a circular, short, cylindrical jacket with a flat conical cover and a bottom portion (FIG. 5). The cover 20 and the bottom portion are made in the form of two perforated sheets 21 and 22. A material feed stub 23 is incorporated in the cover 20. A porous, i.e. air-permeable foam rubber mat 24 is located between the perforated sheets 21 and 22 of the cover 20, and when moistened serves as an odor absorber.

It is known that aerobic decomposition processes, especially in their initial phases, have a tendency to generate a strong unpleasant odor. Particular emphasis is placed in this process upon the elimination of these unpleasant odors. For this reason, the escaping gases, which consist primarily of water vapor charged with carbon dioxide and ammonia, are not allowed to escape untreated into the atmosphere. However, in order not to interfere with the abovedescribed ventilation system for the decomposition reactor installation, a conventional exhaust gas wet scrubber using odor-absorbing chemical liquids cannot be utilized. Moreover, the amounts of escaping air are too small to justify the use of such a scrubbing installation.

These considerations led to the construction of the absorbent cover 20 described above. Studies conducted with the pilot plant have showed that when the reactor 9 is sealed by a solid cover, excess pressure builds up in the reactor head, produced by the temperature-dependent air movements of the aerobic decomposition process. If this excess pressure is allowed to build up, the aerobic decomposition process will come to a complete halt after a short time. The reason for this throttling of the process, under the conditions described above, can be explained as follows: The interaction of the "air cushion" which forms beneath the roller grid 10 with its slight overpressure, as well as the overpressure that builds up in the reactor head during the process, which in this case acts as a brake, cause the gas exchange which is absolutely necessary for aerobic decomposition to come to a halt.

The absorber cover 20 covers the entire reactor opening with the exception of inlet stub 23 for the decomposing material. The porous, i.e., air-permeable foam rubber mat 24, serves to equalize the pressure and acts as a static wet scrubber. Since the air resistance of the foam rubber mat 24 is only about 1-2 mm water column even when wet under the desired conditions, the exhaust air is forced out in the desired amounts through the mat 24 into the open air after this pressure is reached in the reactor head. As a result of the temperature differential (warmer inside reactor 9, cooler outside reactor 9), the water vapor contained in the exhaust air condenses in the foam rubber mat 24 and keeps the latter constantly supplied with condensate.

The side of the foam rubber mat 24 which faces the open atmosphere is constantly being dried out, which prevents the pores in the foam rubber from being completely blocked. It has been found that the moisture in the mat 24 is completely sufficient to keep the escaping air being forced through it free of odor.

It has also been found that the structure of the material being decomposed makes a considerable contribution to the success of the decomposition process.

The double-shaft mixer 4, which is used to mix the dry and wet fresh material, is unable to produce the necessary spherical structure required for the reliable accomplishment of the decomposition process. Therefore, a way must be found to make the material which leaves double-shaft mixer 4 as pulverized material substantially spherical in shape as it is transported to the reactor loading opening 23 in some conventional, i.e., mechanical manner. For this purpose, the vertical feed screw 7, which is approximately 100% overdimensioned in its feed capacity, is used.

The rpm, diameter and slope of the screw threads determine the amount delivered by the feed screw 7.

If the vertically mounted feed screw 7 is loaded with only approximately 50% of its actual load capacity, at a constant rpm, i.e. feed rate, the residence time of the product being fed within the feed screw 7 will be increased accordingly.

If the feed screw 7 is charged with pulverized moist and therefore formable material, this material begins to slide back or roll back on the upward feed path in the threads of the feed screw 7.

The interaction of the material being fed by the screw 7, as well as the natural tendency of the pulverized wet material being fed to slide and/or roll downward in the screw threads produces the desired spherical shape of the product intended for decomposition.

This "spherical shape" of the decomposing material is again disrupted in the lower part of reactor 9 by pressure in the course of a few hours. The removal of this decomposing material which forms small approximately fingernail-sized flakes after being compressed, into the double-shaft mixer 4, which loosens it, and another pass through the vertical feed screw 7, again restores the desired spherical structure of the decomposing material.

Temperature sensors 25 are built in at vertical intervals over the entire height of the decomposition reactor 9 to monitor the temperature of the decomposition taking place in the decomposition reactor 9.

A mixture of exhaust air and fresh air is drawn out of the decomposition reactor 9 and the atmosphere by a fan 26 through a by-pass 27 connected with an air-mixing chamber 28. This mixture is then fed into the material-collecting funnel 14 mounted below the toothed roller grid 10.

A valve system 29 is provided in the air-mixing chamber 28 and controls the mixture of fresh air and exhaust air. In order to prevent the escape of the air mixture which is fed by the fan 26 into the material-collecting funnel 14, the decomposition reactor 9, material-collecting funnel 14 and the double-shaft mixer 4 are connected to one another in an airtight manner.

Likewise, in order to prevent air losses, sealing valves 33, 34, 35 and 36 are incorporated in material-transfer connections 30 of the continuously adjustable feed screw 6, in a material-transfer connection 31 of the continuously adjustable feed screw 3, as well as in a material-transfer connection 32 of the vertical feed screw 7 and in the dump chute 8 of the vertical feed screw 7.

After the decomposition process in the decomposition reactor 9 is complete, the decomposed material is dumped through the roller grid 10 and conveyed, via the material-collecting funnel 14, into the double-shaft mixer 4, which delivers it into the vertical feed screw 7.

A sealing valve 37 in a second dump chute 38 of the vertical feed screw 7, which remains closed during the actual decomposition process, is then opened and deflects the decomposed material into a screw press 39.

During this process, the sealing valve 36 in the dump chute 8 of the vertical feed screw 7 remains closed.

In the screw press 39 the material is compressed into pellets, which are then fed into a drying tower 42 by a material-delivery connection 40, closable by a sealing valve 41.

The drying tower 42 includes a square container of square cross section which is provided with fans 44 built into its cover 43.

Inside the drying tower 42, ventilation units 45 are disposed in such a way that it is possible for the air drawn in by the fans 44 to flow uniformly over the entire contents of the drying tower 42 which largely consists of pellets.

The outlet of drying tower 42 is delimited by a material-dumping funnel 46, to which a feed screw 47 is fitted.

Following completion of the drying process in the drying tower 42, two toothed rollers 48, 49, separated by the ventilation units 45, are set operating, and convey the dried pellets into the material-dumping funnel 46, these pellets then being fed to a breaker 50 by the feed screw 47. From the breaker 50 the broken material is drawn up by the air stream of a fan 51, conveyed through an air pipe 52, and then separated in a cyclone 53, followed by a dust filter 54. This material then lands in the dried-material or storage silo 5.

A control valve 55 is provided in material-dumping funnel 46 of drying tower 42 to regulate the amount of drying air, and an oil-fired hot gas generator 56 is incorporated to preheat the drying air.

The decomposition reactor 9 can have the following dimensions for example: its base may be $2 \times 2$ m$^2$ and its height may be 3.5 m. The air throughput of the reactor 9 of the above-noted dimensions is from out 800 to about 1,000 m$^3$/h, the volume of air circulated is approximately 30%, the over-pressure in the so-called cushion beneath the roller grid 10 is approximately from 7 to 10 mm of water, and the pressure beneath the cover 20 is approximately +1 mm of water.

After being conveyed by the feed screw 7, the spherical particles have a diameter of about from 3 to 6 mm.

An important prerequisite for smooth functioning of the apparatus described above for carrying out the rapid decomposition method of the present invention is the preliminary dewatering of the wet material (sludge and pig manure) by means of centrifuging, belt or filter presses, or the like. The use of preliminary dewatering machinery for decomposition of chicken dung or cattle dung, with few exceptions, is not necessary because in this type of excrement the solid content is already in the range of 22% to 12% as a rule.

However, since the water content of the wet material must not be more than 50% before it is fed into the rapid decomposition reactor 9, in all cases the wet raw material must be mixed with an organic material, as dry as possible and an absorbent carrier substance (appropriate dry material) until the desired moisture level is reached.

In the rapid decomposition apparatus described here, a technique is used to reduce the water content of the various wet products in which the wet raw material is enriched with appropriate dry material until a product results whose moisture content and structure allow aerobic material conversion. The dry material necessary to increase the solid content is obtained by recycling a portion of the wet solid material with interposition of a moisture removal stage. Aside from the single addition of foreign solids required at the beginning of the process (e.g. peat), the method is free of use of solid additives.

In contrast to the known methods of Kneer or Schnorr, the rapid decomposition method of the present invention requires no so-called carbon carrier to trigger the aerobic decomposition process. This applies both to partially stabilized or raw sludge as well as to animal excrement.

All additional batches of raw material to be treated are mixed with appropriate dry material which was previously decomposed and then dried in order to reduce the water content of the material supplied by 50%.

The quantities of previously dewatered sludge or animal excrement and dry material are heated in an insulated reactor for rapid decomposition by the activity of aerobic microorganisms within one or two days at temperatures of 70°-75° C. The temperatures required to kill off salmonella, viruses and parasites are reliably reached throughout the entire volume of material being treated in this process, especially by using a heat-insulated reactor.

Temperatures of more than 80° C. can be reached for brief periods of time during the decomposition process. Since the activity of thermophilic decomposition organisms is nearly completely exhausted at 75° C., higher temperatures very probably are due to unknown chemical processes. However, these temperatures are undesirable, since they cause among other things ashing of the decomposing material.

To reduce the temperature, it is sufficient to throttle the oxygen supply, but in some cases this leads to a reduction of the decomposition rate. However, since a system of this kind operates only very slowly, a process control has been developed which is able to react to excessively high temperatures in a rapid and effective manner.

The measurement probes 25 described, which are distributed over the entire height of the reactor 9 sense and transmit signals corresponding to the temperatures continuously are connected to an automatic temperature-dependent switching mechanism and to a temperature recording device.

If the measurement probes 25 sense a temperature of more than 75° C. for several hours and transmit it to the automatic switching mechanism, the latter automatically sets in operation the throttling step described above.

This throttling step is continued until the measurement probes 25 indicate that the cooler material has settled down, by transmitting the new lower signals to the switching mechanism, when then automatically interrupts the throttling step. In this manner it is possible to reduce high temperatures rapidly and effectively without having a markedly negative influence upon the aerobic decomposition process thereby.

The decomposition process in the reactor 9, according to this process, is abruptly interrupted after 4–6 days. This means that the decomposition process or the decomposition of the material is completed.

Therefore, instead of recycling the decomposing material back into the reactor 9, it is fed to a pelletting screw press 39 by the vertical feed screw 7. In this pelletting press 39, the hot decomposing material which contains about 48% water is pressed into cylindrical structures about 25 mm in diameter and 80–100 mm long. These pellets made of decomposing material fall directly from the press into the drying tower 42.

When the drying tower 42 is filled with these pellets, they form a loose very porous fill.

After the filling process is compete, the loading opening is closed and the fans 44 are started. The fans 44 suck large amounts of fresh air through the porous pile of pellets made of decomposing material, resulting in a rapid cooling of these pellets in the tower 42.

This rapid cooling of the pellets results in the immediate interruption of the decomposition process.

In order to insure the fresh air flow uniformly throughout the entire contents of the drying tower 42, the ventilation units 45 are incorporated into the latter as mentioned above. These units 45, on the one hand, may consist of a circumferential double wall reaching halfway up the side of the tower 42, which is provided with air slots of different sizes.

On the other hand, the drying tower 42 is divided at the halfway point by a partition, similar to a steep gable roof, into two chambers of equal size. The sloping surfaces of this partition are likewise provided with air slots of different sizes. This partition, which divides the intrior of the drying tower 42 into two chambers of equal size, serves on the one hand for distributing the aitr and on the other hand, due to the vertical outside walls of the tower 42, forms one funnel in each of the two chambers. Both of the funnels so formed are closed respectively at their outlets by at least one toothed roller, 48, 49 and possibly by two such rollers which are identical in design to those of the roller grid 10 beneath the reactor 9. These toothed rollers 48, 49, which are also driven by oil-hydraulic pistons, serve to expel the dry pellets out of the drying tower 42.

The time required for drying the pellets depends on the decomposition time in the reactor 9. Since the decomposition time is six days as a rule and the decomposed material is pressed into pellets on the seventh day and placed in the drying tower 42, the drying process can also be extended to six days.

At average air temperatures of approximately 10°-12° C. and dry weather, during this period of time will suffice to reduce the water content of the pellets with pure fresh air, i.e. without the addition of thermal energy, from approximately 48% to approximately 18%.

During high atmospheric humidity at certain seasons of the year, or prolonged periods of rain, the fresh air used for drying must be preheated slightly.

This is accomplished by using the oil-fired hot air assembly whose "on" time and duration are controlled by instrumentalities responsive to the relative atmospheric humidity. The aggregates which are delivered through the toothed rollers 48, 49 from the drying tower 42 after the drying process is complete, are caught by the funnel 46 connected to the underside of the drying tower 42.

The dried pellets are carried away from the collecting funnel by the conveyor screw 47 which is flanged to the outlet of the collecting funnel 46; this screw 47 conveys the dried pellets to the toothed roller mill 50. The fresh air required for drying is drawn into the drying tower 42 through a control valve 55 mounted on the collecting funnel 46.

The hot air assembly described above is also flanged to the collecting funnel 46, so that it simultaneously carries out the function of a mixing chamber for hot gases and fresh air.

The dry material obtained in this fashion is not biologically stable. When saturated once again with water and exposed to the atmosphere, the material immediately resumes the decomposition process.

The utilization of this basic knowledge makes it possible in carrying out this decomposition method to avoid the use of carbon carriers as well as other carriers to reduce the water content in the pre-dewatered material.

In the toothed roller mill 50 described above, the dried pellets are ground into a pulverized material and conveyed pneumatically into the supply hopper 53 for the dried material mentioned above. A partial stream of dried material, as was likewise described above, is recycled into the process. The excess dried material can be taken for use as fertilizer in agriculture.

Since loss of nitrogen considerably reduces the quality of decomposed material as agricultural fertilizer, appropriate means are added in this process to condense the water vapor as much as possible without thereby influencing the loss of the carbon monoxide which is formed during the process.

It has also been shown that the microorganisms which produce the aerobic decomposition in the decomposition reactor multiply most rapidly in the mesophilic (up to 50° C.) and also in the thermophilic range (above 50° C.) with increasing temperature and constant humidity, and thus considerably increase the decomposition of the material to be decomposed.

During biological treatment, with increasing temperature, nitrogen losses of up to 30% can occur, primarily in the form of ammonia lost in the form of a gas.

Since on the one hand the high temperature suffices for santizing the decomposing material and must also be maintained, while on the other hand the loss of nitrogen is caused primarily by the escape of the water vapor created during the decomposition process, a way must be found to condense this vapor as much as possible.

In addition, the off-gassing or evaporation of the ammonia produces a strong unpleasant odor, which is likewise intolerable. In order on the one hand to prevent causing environmental damage by emission of odors during the decomposition process and on the other hand to achieve the greatest possible condensation of the escaping vapor, as was described in detail above, the cover 20 of the reactor 9 is built in the form of an absorber in the process described here. Since the clearance in the head of the reactor 9 is about 0.50 m and the porous mat 24 has a minimum resistance, there is a slight overpressure beneath the absorber cover 20 (approximately 1 mm of water), which is not disturbed even by the air circulating system described below. This slight overpressure suffices to force the excess air out into the open through the mat 24.

The water which runs back into the reactor 9 from the inside of the cover 20, which now contains most of the ammonia nitrogen in dissolved form, continues dropping into the porous filler of decomposing material.

In view of the shape of the reactor 9, which tapers conically upward, there is no danger that the drops of water will run downward along the walls of the reactor 9. The drops necessarily fall back into the decomposing material. In this manner, a film of water is produced on the pile of decomposing material which is constantly renewed and likewise prevents excessive vapor generation by virtue of its cooling effect.

Since the decomposition process is largely dependent upon a sufficiently large supply of usable oxygen, a process was selected for this system which ensures a continuous oversupply of oxygen lasting throughout the whole process.

For this purpose, the considerably heated air and water vapor mixture from the reactor head, together with fresh outside air is drawn through an air pipe with a built-in fan through a by-pass system controlled by adjustment valves and compressed into the material-collecting funnel of the reactor 9.

Decomposition reactors, material-collecting funnels and double-walled mixers, as well as all other feed means forming parts of the apparatus are connected to one another in an airtight fashion or are provided by sealing valves.

The warm air mixture, forced by the fan into the material-collecting funnel, produces an overpressure of approximately 7-10 mm water column in the latter. The low pressure of the "air cushion" thus created beneath the reactor 9 and/or the decomposing material naturally does not suffice to force the air and hence the oxygen into the decomposing material.

The only purpose of the "air cushion" is to supply oxygen continuously in sufficient amounts to the reactor or to the aerobic decomposition process taking place therein.

In a decomposition reactor 9 whose shape is comparable to that of a cooling tower or a stack, the self-ventilating or natural draft effect which characterizes this type of design is produced and utilized for carrying out the rapid decomposition process.

This distinctive feature of natural air movement can, of course, only be fully effective in an empty reactor, i.e. one which is not loaded with decomposing material. The self-ventilating effect decreases with increasing material content, but does not completely stop.

As mentioned above, the wet material to be decomposed, before being loaded into the reactor, is mixed with appropriate dry material until a loose granular product with a maximum water content of 50% is produced. Since the weight per unit volume of this mixed material is only approximately 650 kg/m$^3$, a porous, loose and air-permeable material is produced when the material is loaded into the reactor.

With an incipient and advanced decomposition process, the temperature in the decomposition reactor begins to rise and after sixteen to twenty-four hours temperatures between 72° and 78° are reached in the middle two-fourths of the reactor height.

Figure 4:
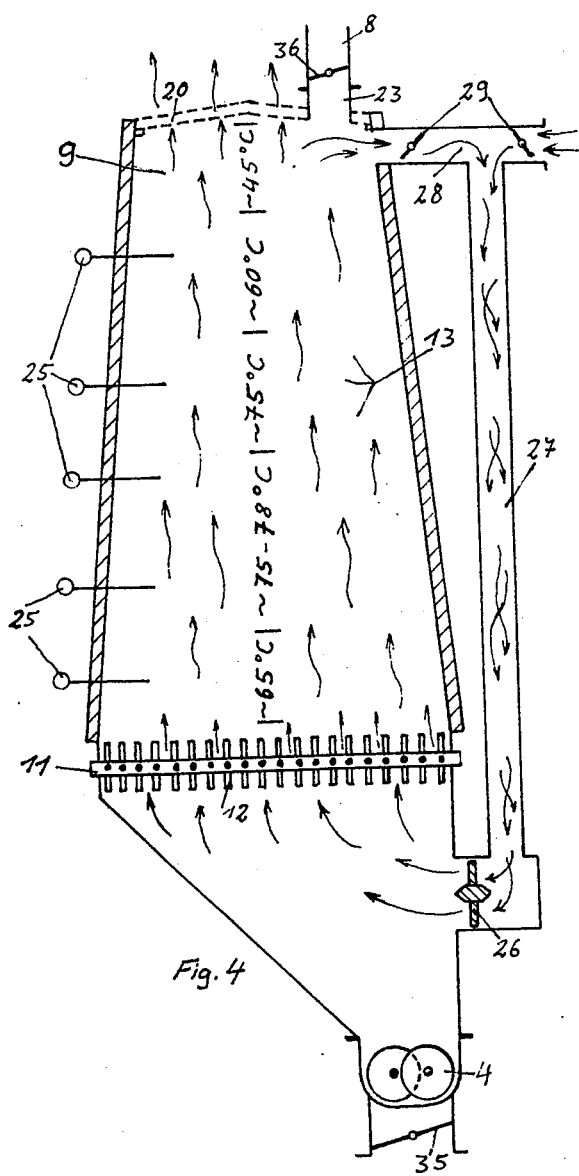
FIG. 4 is a vertical cross section through the decomposition reactor of FIG. 1, showing the patterns of temperature variation and air movement which occur therein.

By virtue of the slight overpressure on the one hand, which supplies warm, oxygen-rich air to the decomposition process, and the temperature stratification created by the advancing decomposition process (see FIG. 4: ¼ cooler, 2/4 warmer, ¼ cooler), the self-ventilating effect caused by the shape of the reactor once again becomes effective.

The suction which produces the self-ventilation as well as the natural tendency of warm air to rise, forming the warm air cushion under the reactor 9, cooperate to produce the desired air exchange and hence to supply sufficient amounts of the necessary oxygen for decomposition. Extensive experiments on a fully industrial scale have shown that oxygen utilization of the air flowing through the reactor and/or the loss of oxygen to the decomposition process is relatively slight. As a rule it is 2.5-2.7%.

On the other hand, the air requirement per cubic meter of decomposing material, at approximately 120 m$^3$/h is relatively high. This means that the air drawn in by the by-pass system into the material-collecting funnel must be mixed with only enough fresh air for the oxygen content of the air cushion to ensure that the maximum possible amount of oxygen is supplied to the decomposing material.

An important element in controlling the decomposition process is temperature monitoring using thermocouples. The ideal decomposition temperature in the high-temperature zone of the reactor is about 74° C., at which, as already mentioned above, after a few hours the parasites, etc., located in the decomposing material are eliminated. Allowing the temperature to rise further is therefore unnecessary and also undesirable.

It has been found advantageous to connect the temperature monitoring and the drive assembly of the roller grid 10, as well as the drive of the double-shaft mixer 4 flanged to the outlet of the material-collecting funnel and the vertical feed screw 7 associated with the latter by a pulsed control device in such manner that temperature-controlled material stratification takes place. If the temperature monitoring system in the high temperature range of the reactor 9 shows 74° C. for several hours, the temperature monitoring device transmits its measured values to the control unit, which in turn starts the roller grid 10, the double-shaft mixer 4 and vertical feed screw 7 operating. By starting these assemblies operating, the decomposed material is turned over from bottom to top until the hot material has left the high temperature zone and the turnover step is concluded by the sliding of colder material into the high temperature range of the reactor 9, as indicated by the temperature monitoring system. Before the turnover step begins, the sealing valves which close off the individual feed units from one another in an airtight manner are automatically opened and the fan which produces the air cushion is shut off. After the turnover step is concluded, the original operating state is automatically restored.

The material turnover step is one of the important features of the decomposition installation described. The shape of the decomposition reactor 9 already mentioned above causes the entire charge of decomposing material located inside to rest upon the roller grid 10 which forms the reactor bottom. The rollers 11 of the grid 10, parallel to one another with an axial distance of approximately 300 mm, are provided for their entire length with four rows each of the teeth 12 made of pieces of flat iron. Each row of teeth 12 is displaced 90° around the circumference of its associated roller 11.

The rollers 11 are mounted in such fashion that one tooth 12 on the first roller 11 comes to rest between two teeth 12 of the second roller 11. The distance between the individual teeth is about 50 mm, so that when the thickness of an individual tooth is about 12 mm, when the roller grid 10 is completely installed the distance from tooth 11 to tooth 11 is about 19 mm. The above-mentioned meshing of the individual teeth 11 practically prevents the decomposing material, resting on the roller grid 10, from falling through with the rollers 11 in any resting position. The roller grid 10 is driven by gears connecting the rollers 11 together.

One of the rollers 11 is equipped with an additional ratchet and an associated ratchet mechanism, and driven by an oil-hydraulic piston.

When the rollers 11 in the roller grid 10 are set rotating slowly during the decomposition process, the teeth 12 in the rollers 11 engage the material resting upon them and throw it down into the material-catching funnel 14.

From the funnel 14, the decomposing material falls into the double-shaft mixer 4 flanged below, which feeds the material with simultaneous loosening and continuous mixing into the vertical feed screw 7. The vertical feed screw 7 carries the decomposing material upward and throws it back into the reactor 9. In a vertical feed screw 7 which is only partially loaded, the decomposing material, as a result of the rotation of the feed screw 7 and the natural tendency of the material to slide downward through the screw threads, is shaped into small damp balls or pellets. These small pellets are spherical structures, which are formed automatically in this manner during the conveying process, ensure a loose, porous pile-up of decomposed material in the reactor 9.

Of course, the destructive pressing of the material piled up in the reactor 9 despite mechanically produced improvement of the stability of the pulverized aggregate, cannot be prevented beyond a certain pile height. The cooperation between the shape of the reactor 9 and the removal mechanism makes it possible to turn over the entire contents of the reactor 9 at any time, wholly or in part, without any jamming, whereby the word "turnover" should not be confused with rolling over, which would disturb the material.

"Turnover" in the sense of the present method means that the pulverized material stratified in the reactor 9 and which is to be decomposed is scraped away uniformly and simultaneously over its entire support or bottom surface, loosened mechanically, and fed back into the reactor 9 while retaining its structure.

This means that the material is conveyed downward layer by layer and thrown back in again in the same order from above. In this process, complete mixing of the individual layers does take place, but in no case is there a complete mixing of the entire reactor contents. By virtue of this turnover step, two goals necessary for the smooth functioning of the process are achieved.

Since when the contents are at rest the pressure in the lower third of the reactor 9 becomes increasingly great, the number of gas-conducting pores which are absolutely necessary for the uptake of oxygen decreases approximately proportionally with increasing height.

Since this turnover step is carried out once daily or even several times daily, the porosity of the decomposing material in the reactor 9 is fully ensured at all times.

The frequency of this step is determined in such manner that the resting periods do not suffice to allow the pressure to become so high that the gas-conducting pores can close completely.

The mechanical loosening of the decomposing material after being removed from the bottom of the pile takes place under atmospheric conditions. During the loosening process, the material is exposed to fresh air and therefore enriched with fresh air and/or oxygen before being returned to the reactor. This "saturation" however is insufficient to keep the decomposition process properly under way.

The conically upward tapering shape of the decomposition reactor 9, with a square bottom cross section at the same time, whose entire area is covered by the roller grid 10, results in that the material resting on the roller grid 10 is supported uniformly. This prevents bridging in the reactor 10.

The feed assemblies described above, such as the doubleshaft mixer 4 and the vertical feed screw 7, in addition to turning over the decomposing material during the processing time, are also used for preparing and loading the reactor 9 with fresh mixed material intended for decomposition. To load the reactor 9, the fan which generates the "air cushion" is also shut off and all of the sealing valves which shut off the feed devices from one another are automatically opened.

Then, by means of the continuously adjustable feed screw, previously decomposed appropriate dry material is fed from the supply container 5 into the double-shaft mixer 4 in metered amounts.

At the same time, wet material intended for decomposition is supplied to the double-shaft mixer 4 through the volume-adjustable feed screw 3 after being previously dewatered.

In the double-shaft mixer 4, both types of material are fed to the vertical feed screw 7 with continuous intensive mixing, which conveys the material in the manner already described above into the decomposition reactor 9. Since at the time the decomposition reactor 9 is filled with new material to be decomposed it is already two-thirds empty, there is only a little material in the reactor 9. In order to achieve a rapid decomposition reaction in the fresh material to be decomposed, the decomposing material left in the reactor 9, at a temperature of about 50–60° C., is used as a starting material.

This has the result that the material intended for starting the fresh product must also be fed in metered amounts into the double-shaft mixer 4 during the mixing process. This takes place by causing the roller grid 10 of the decomposition reactor 9 to rotate slowly during the mixing process, whereupon the material resting upon it is fed into the double-shaft mixer 4 through the material-collecting funnel 14 in the manner described hereinabove, which then mixes the starter material and fresh material in an intensive manner on the way to the vertical feed screw 7.

The process described hereinabove, and in particular the installation described for working the decomposition process, differ in essential points from the processes and installations known heretofore for accomplishing this different process.

These basic novelties involve both the process for rapid decomposition of previously dewatered sludge as well as animal excrement and the mechanical devices developed to work the process. Although known assemblies are used in the above-described mechanical devices, their combination for working the rapid decomposition process as well as the purpose to be achieved by them are basically new.

Figure 6:
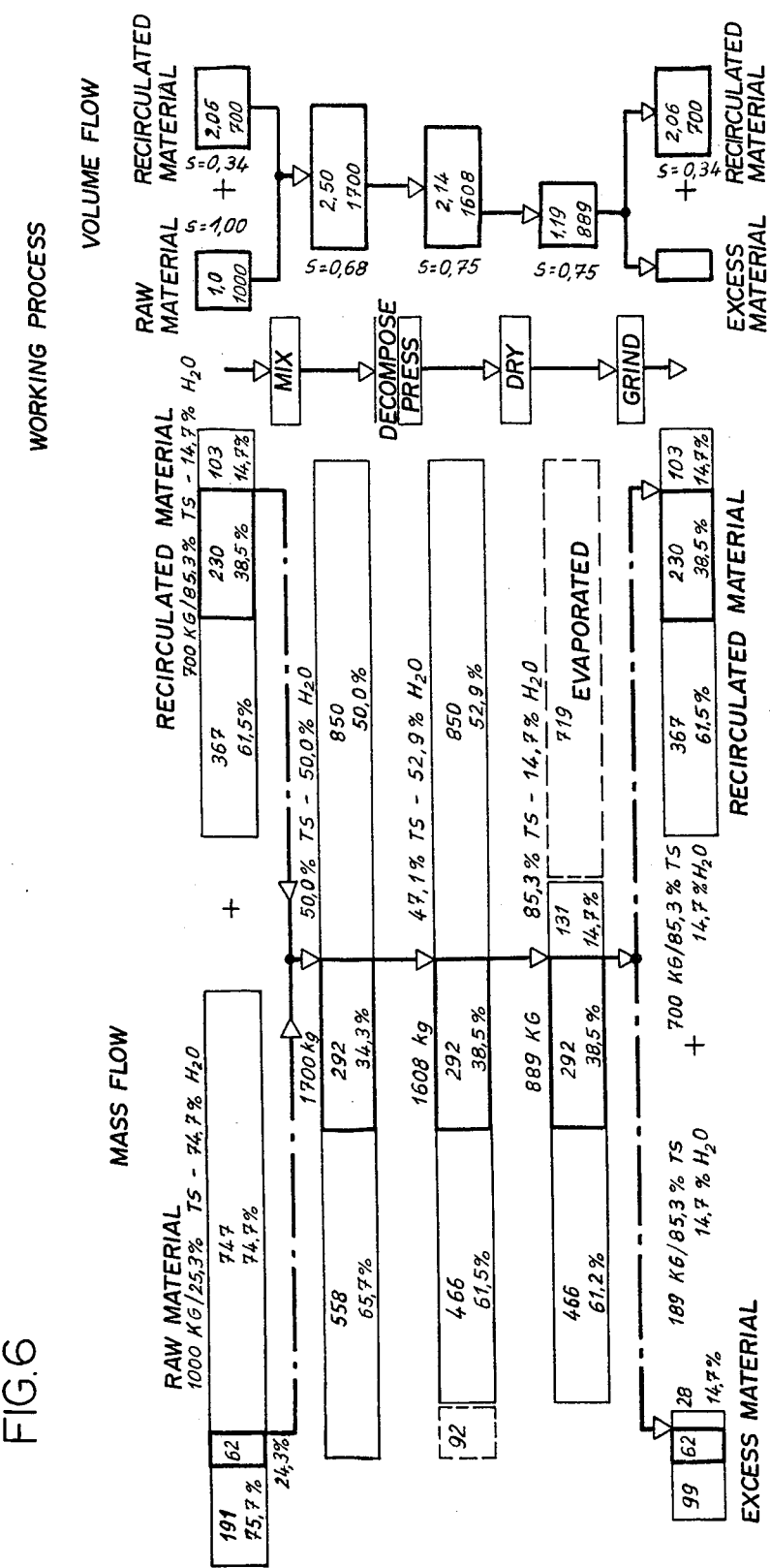
FIG. 6 is a graphic representation of the material balance as a mass-flow and volume-flow chart of the moist material to be decomposed.
Figure 7:
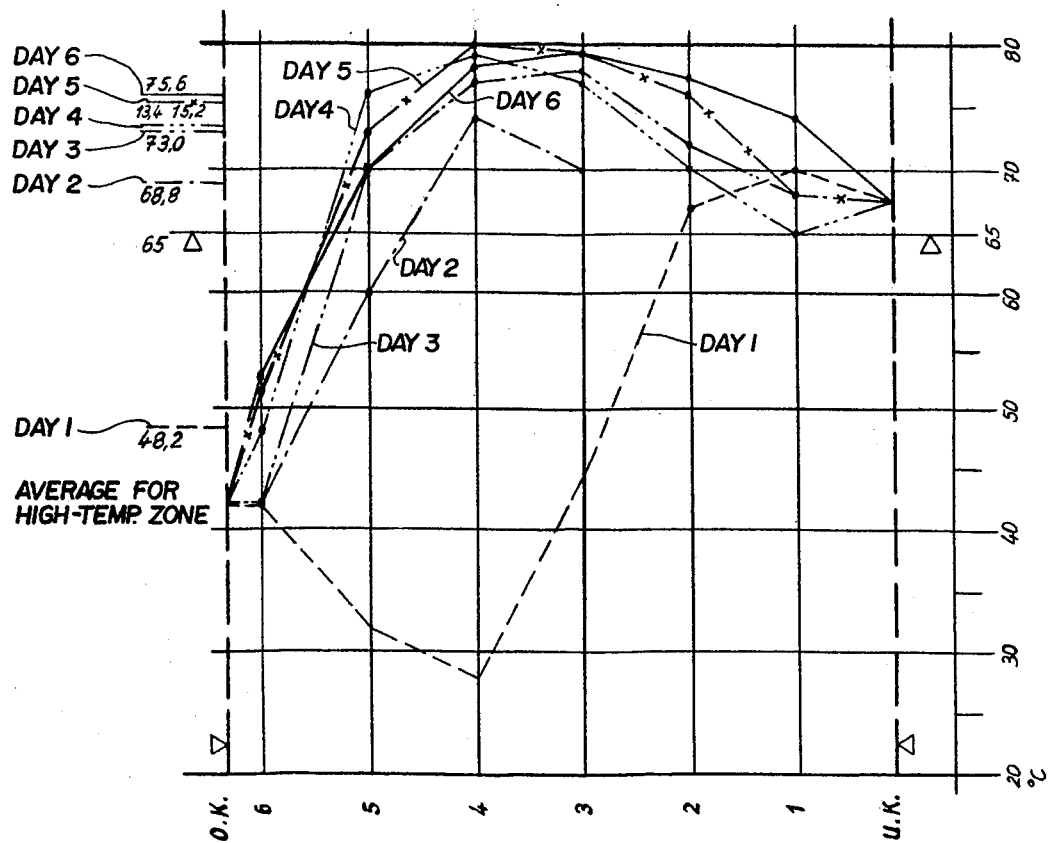
FIG. 7 is a graphic representation of the temperature development in the decomposition reactor, typical of the method of the present invention.
Figure 7:
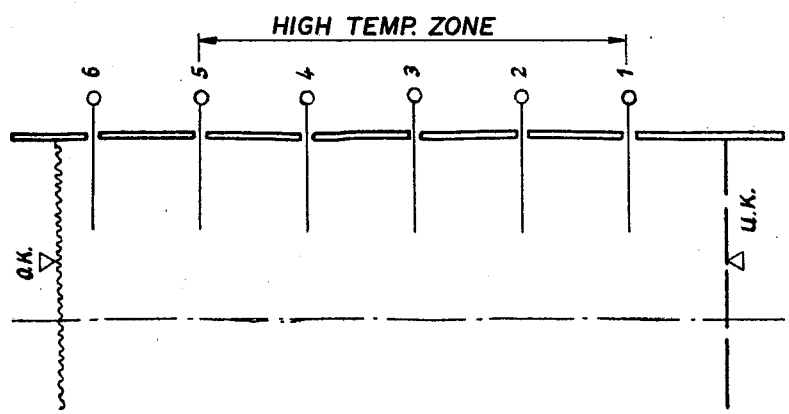

The graphical illustrations of FIGS. 7 and 8 and the flow charts shown in FIG. 6 set out some characteristics of the present invention in a succinct fashion as aids to understanding the invention; these figures are self-explanatory.

It is to be appreciated that the foregoing description and accompanying drawing figures, which relate to a preferred embodiment of the present invention in its apparatus and method aspects have been set out by way of example, not by way of limitation. Other embodiments and variants are possible without departing from the spirit and scope of the invention, its scope being defined by the appended claims.

What is claimed is:

1. A method of aerobic decomposition of organic solids, comprising:
   mixing the material to be decomposed with a relatively drier material in an amount sufficient to decrease the water content of the mixture to below a predetermined upper limit;
   conveying the mixture to the top of a thermally insulated, upwardly tapering tower reactor, and adding the mixture thereto;
   continuously introducing an oxygen containing gas under superatmospheric pressure beneath the tower reactor, thereby causing the gas to continuously pass through the mixture of material in the tower reactor; and intermittenly, under predetermined temperature-controlled conditions, removing the mixture of material from the bottom of the reactor in layers, conveying the removed material back to the top of the tower reactor, and adding the removed material into the top of the tower reactor to form a covering layer thereon;

wherein said steps of conveying the mixture of material and conveying the removed material to the top of the tower reactor are accomplished by sliding back or rolling back the material, while being conveyed, to shape the material into balls of a substantially spherical shape.

2. A method in accordance with claim 1 wherein said balls are dimensioned such that they have a weight per unit volume, when piled, of 600–700 kg/m$^3$.

3. A method in accordance with claim 1 wherein the amount of relatively drier material mixed with the material to be decomposed in said mixing step is sufficient to decrease the water content of the mixture to no more than 50%.

4. A method in accordance with claim 1 wherein sufficient oxygen is added during said introducing step to permit the local temperature near the center of the material in the insulated tower reactor to rise to 70–75° C. in 1 to 2 days.

5. A method in accordance with claim 1 wherein said intermittent removing step begins when a temperature of more than 75° C. is reached within the material in the tower reactor and maintained at such temperature for at least one hour.

6. A method in accordance with claim 1 wherein sufficient oxygen is added during said introducing step to permit the local temperature to rise within 16 to 24 hours, to 72–78° C. in the middle two quarters of the height of the tower reactor.

7. A method in accordance with claim 1 further including the step of maintaining the relative humidity in the tower reactor at least approximately constant during the decomposition process by controlling the humidity of the gas.

8. A method in accordance with claim 1, further including the steps of pressing the material, after decomposition, into pellets in the form of short rods, and drying said pellets.

9. A method in accordance with claim 1, wherein said conveying steps in which said balls are shaped comprise using a vertical feed screw dimensioned to be loaded to no more than 50% of capacity during said conveying steps, thereby permitting the formation of spherical balls during the vertical conveying.

10. A method in accordance with claim 1, further including monitoring the temperature within the tower reactor by means of a temperature sensor.

11. A method in accordance with claim 1, wherein said relatively drier material in said mixing step comprises previously aerobically decomposed organic solids.

12. A method according to claim 1, including further the steps of pressing the decomposed material into pellets in the shape of short rods, and drying said pellets.

13. A method according to claim 12, wherein the drying step includes drying said pellets while piled in a drying tower.

14. A method according to claim 12, wherein the drying step comprises drying said pellets with pre-heated, fresh air approximately for a time equal to the duration of a decomposition process.

15. A method according to claim 14, wherein the drying step is continued until the water content of said pellets is reduced to about 20% or less.

16. A method according to claim 12, wherein the drying step is carried out for a period of about six days.

17. An apparatus for aerobic decomposition of organic solids, comprising:

an upwardly tapering decomposition tower;
a support surface means near the bottom of said tower for supporting the material to be decomposed, said support surface means comprising a roller grid;
a screw mixer passing below said tower in a manner whereby material passing through said roller grid is received;
first admitting means for admitting material to be decomposed to said screw mixer;
second admitting means for admitting relatively drier material than said material to be decomposed to said screw mixer;
a vertical screw conveyor arranged such that the inlet thereof receives material passing through the outlet of said screw mixer and the outlet of said vertical screw conveyor dumps material passing therethrough into the top of said tower when in use;
temperature measurement means connected to said tower and distributed over the height thereof for measuring the temperature of material within the tower;
gas circulation means for causing oxygen containing gas to be introduced below said roller grid and to pass upwardly through the material in said tower; and
a gas-permeable, water-vapor condensing cover covering said tower.

18. An apparatus in accordance with claim 17 wherein said cover includes a porous, open-pored foam rubber insert.

19. An apparatus in accordance with claim 17, further including a drying tower arranged to receive decomposed material after it has exited said tower.

20. An apparatus in accordance with claim 19, further including press means, arranged between said tower and said drying tower, for pressing the decomposed material into pellets.

21. An apparatus in accordance with claim 19, wherein said drying tower is substantially cuboid in shape and is provided with ventilating means having air introduction slots.

22. An apparatus according to claim 21, wherein said ventilating means comprise a central pyramidal unit of which the surface is provided with said air introduction slots.

23. An apparatus according to claim 21, wherein said ventilating means comprise slotted sheets which are mounted on the inner lining of said drying tower.

24. An apparatus according to claim 21, wherein said ventilation means define at least one rectangular emptying slot into which at least one roller is mounted which serves as an emptying means.

25. An apparatus according to claim 24, wherein said at least one roller is a toothed roller.

26. Installation according to claim 17, wherein said decomposition tower reactor has a square or rectangular shaped cross section at its bottom and a circular or oval cross section at its top.

* * * * *